United States Patent [19]
Boie et al.

[11] Patent Number: 5,963,273
[45] Date of Patent: Oct. 5, 1999

[54] CIRCUIT FOR CARRYING OUT DIGITAL NYQUIST FILTERING OF IF INTERMEDIATE FREQUENCY SIGNALS

[75] Inventors: Werner Boie, Strasbourg; Elias Bou Sleiman, Rennes, both of France

[73] Assignee: Thomson multimedia S.A., Boulogne Cedex, France

[21] Appl. No.: 08/763,179

[22] Filed: Dec. 10, 1996

[30]  Foreign Application Priority Data

Dec. 22, 1995 [FR] France ................................. 9515401

[51] Int. Cl.⁶ ...................................................... H04N 5/44
[52] U.S. Cl. .......................... 348/725; 455/213; 455/306; 455/424; 364/724.011; 375/350; 375/229
[58] Field of Search ..................... 348/725, 726, 348/392, 424, 639; 455/339, 340, 306, 307, 213; 375/346, 350, 229, 230; 364/724.11, 724.12, 724.2, 724.17, 724.16

[56]  References Cited

U.S. PATENT DOCUMENTS

| | | | |
|---|---|---|---|
| 4,594,607 | 6/1986 | Lewis, Jr. et al. | 358/23 |
| 4,751,663 | 6/1988 | Yamazaki | 364/724.011 |
| 4,789,897 | 12/1988 | Kappeler et al. | 358/188 |
| 5,089,981 | 2/1992 | Cabot | 364/724.16 |
| 5,331,416 | 7/1994 | Patel et al. | 348/614 |
| 5,337,091 | 8/1994 | Harford et al. | 343/737 |
| 5,432,723 | 7/1995 | Chen et al. | 364/724.01 |
| 5,568,202 | 10/1996 | Koo | 375/350 |
| 5,694,422 | 12/1997 | Kaku | 375/229 |
| 5,737,254 | 4/1998 | Lane et al. | 364/724.17 |
| 5,737,327 | 4/1998 | Ling et al. | 370/335 |

FOREIGN PATENT DOCUMENTS

| | | | |
|---|---|---|---|
| 0651526 | 5/1995 | European Pat. Off. | H04J 1/05 |
| 0683607 | 11/1995 | European Pat. Off. | H04N 5/44 |

*Primary Examiner*—Andrew I. Faile
*Assistant Examiner*—Reuben M. Brown
*Attorney, Agent, or Firm*—Joseph S. Tripoli; Peter M. Emanuel; Kuniyuki Akiyama

[57] ABSTRACT

The circuit for the digital filtering of IF intermediate frequency video signals comprises an A/D (analog/digital) converter and a Nyquist filter (N); an analog prefilter, suitable for selecting the desired channel, is placed upstream of the A/D converter. The Nyquist filter (N) is a digital filter placed downstream of the A/D converter, composed of two IIR filters (15, 16) placed in cascade, one (16) of these IIR filters being produced in non-causal form with spectrum conjugate to the other IIR filter (15) produced in causal form, and of an FIR filter (17) in series, for correcting the IIR filters.

16 Claims, 15 Drawing Sheets

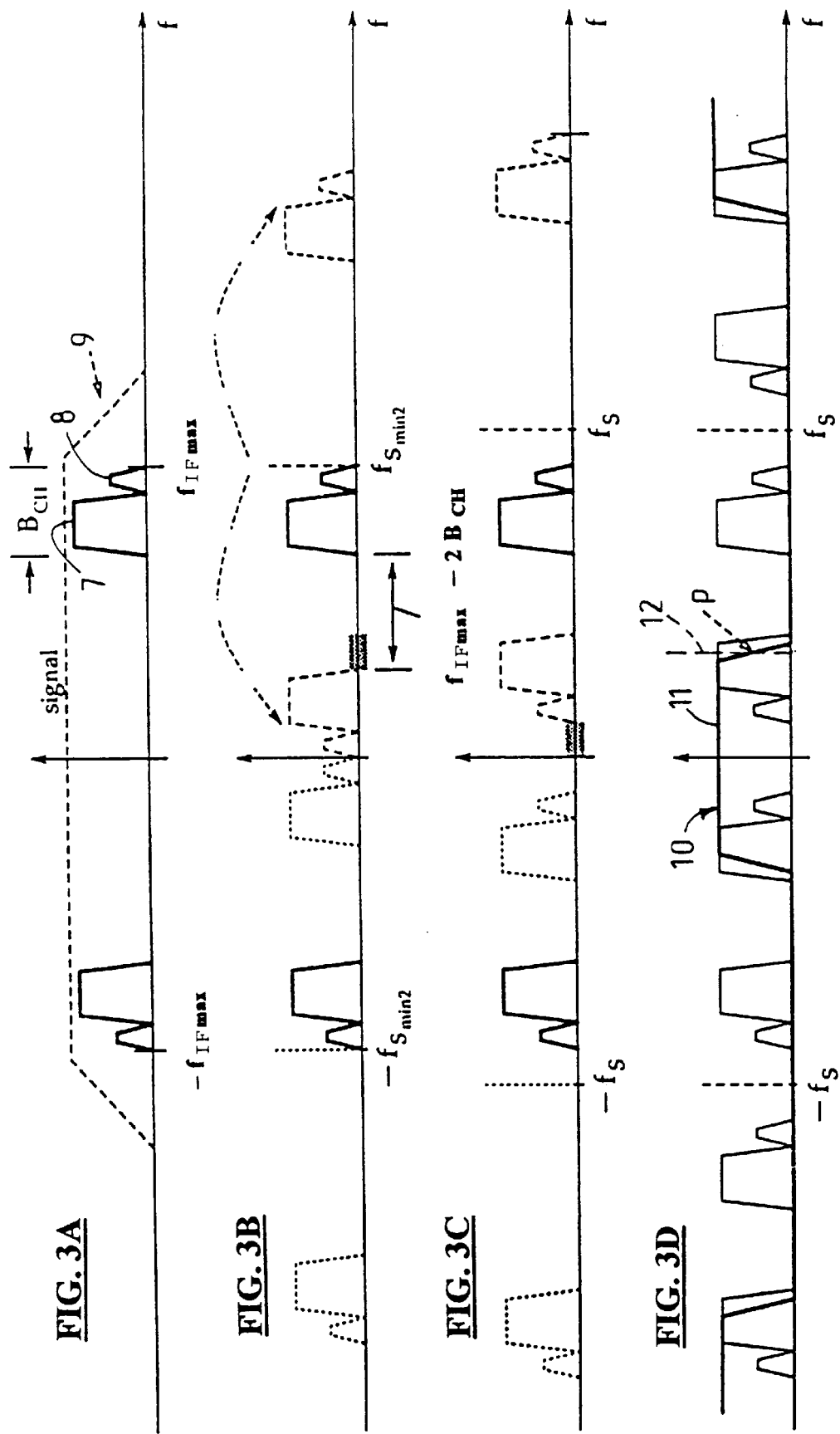

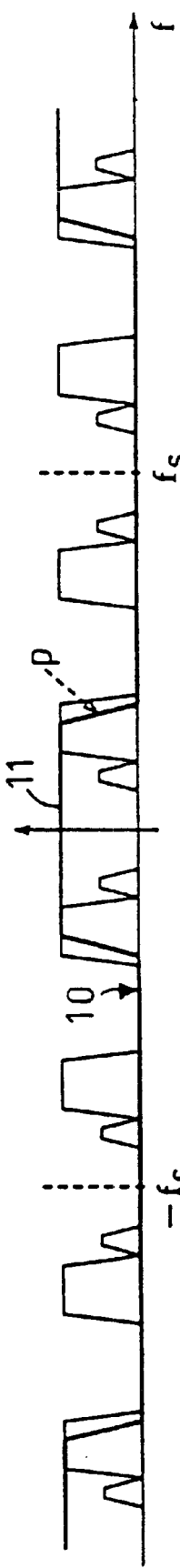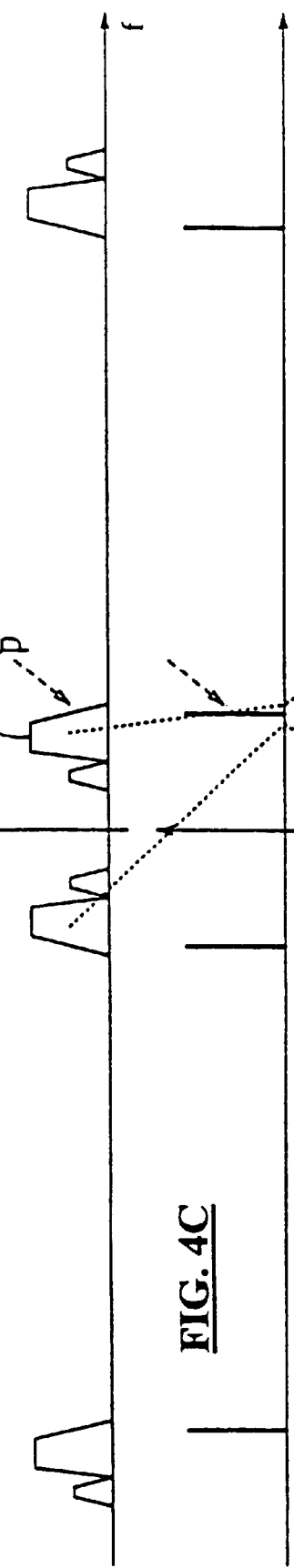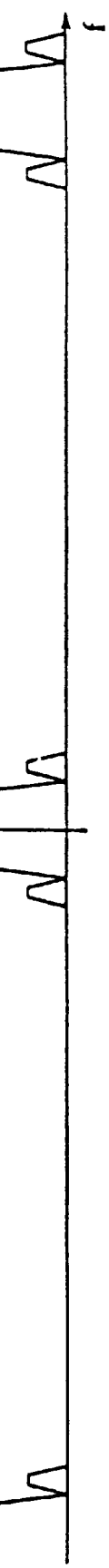
FIG. 4A
FIG. 4B
FIG. 4C
FIG. 4D
FIG. 4E

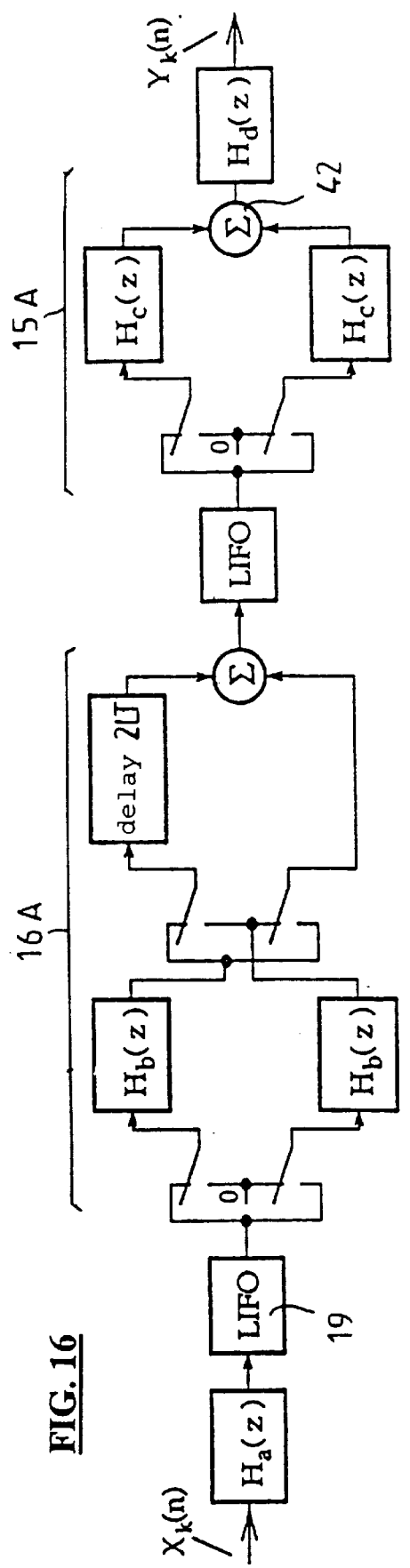
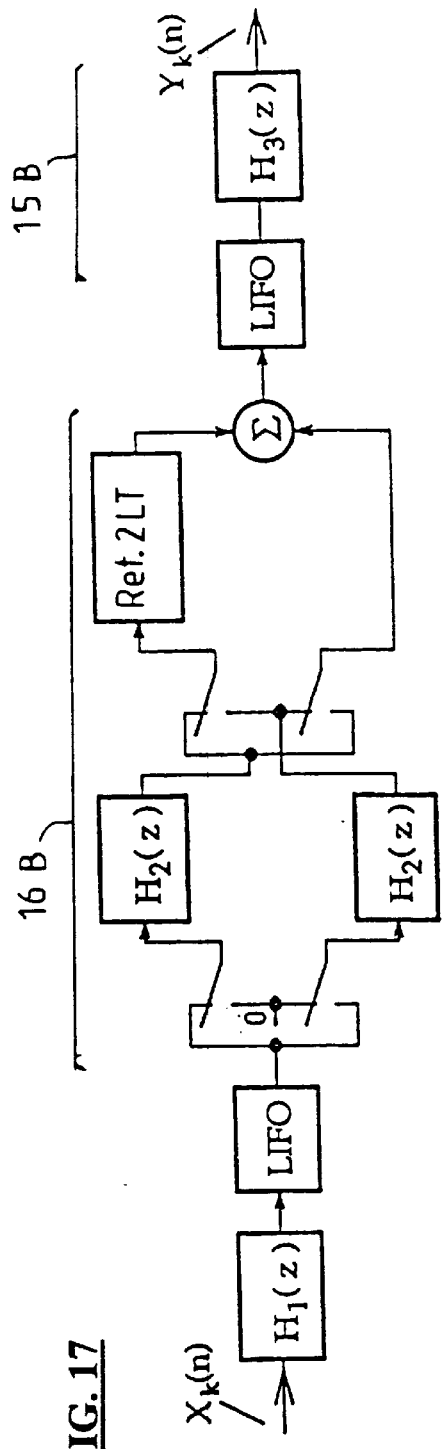
FIG. 16
FIG. 17

$\beta_1 = b_1 2^m$ $\beta_2 = b_2 2^m$

CIRCUIT FOR CARRYING OUT DIGITAL NYQUIST FILTERING OF IF INTERMEDIATE FREQUENCY SIGNALS

The invention relates to a circuit for carrying digital Nyquist filtering of IF intermediate frequency signals.

The invention is more particularly concerned with the digital filtering of intermediate frequency IF television signals from a tuner.

In current television receivers, the Nyquist filter in the IF intermediate frequency circuit represents a complex part of the signal processing. It is carried out in analog form with the aid of an SAW device (surface wave filter), with a characteristic selecting a narrow band, this filter preceding the analog video demodulation stage. Whilst the cost/performance relationship of SAW filters can be regarded as excellent, there can be no integration of such filters with CMOS circuits on the same chip at reasonable cost. With the aim of a solution with a fully digital system, the analog technique must consequently be abandoned in favour of a digital technique.

A design of digital filter with finite impulse response FIR has therefore been considered, offering performance equivalent to that of SAW filters.

With regard to video signal processing, a paramount requirement is that the behaviour in respect of the phase of the signals passing through a filter be the same for all the frequencies.

A linear-phase FIR filter would enable a digital filter to be produced which meets this requirement. Unfortunately, such an FIR filter would need a very large number of coefficients of the order of 100 or more, leading to a prohibitive cost.

Therefore, the purpose of the invention is, primarily, to provide a circuit allowing digital Nyquist filtering of IF intermediate frequency signals, in particular video signals, which is of acceptable economic cost whilst ensuring a behaviour in respect of the phase of the signals which is the same or substantially the same for all the frequencies.

The invention consisted in combining at least one simplified, and hence less costly, FIR filter which, however, by itself does not enable the desired result to be achieved, with two IIR infinite impulse response filters placed in cascade, one of these filters having a conjugate spectrum to the other IIR filter.

An IIR filter costs less to produce than an FIR filter, but does not allow the requirement of phase proportional to frequency to be satisfied. Combining with a conjugate filter makes it possible to get nearer to the requirement of phase proportional to frequency; combining with the simplified FIR filter enables a satisfactory result to be obtained.

According to the invention, a circuit for carrying out Nyquist filtering of IF intermediate frequency signals, especially video signals, comprises an A/D (analog/digital) converter and a Nyquist filter, and is characterized in that it includes an analog prefilter, suitable for selecting the desired channel, placed upstream of the A/D converter; and in that the Nyquist filter is produced in the form of a digital filter placed downstream of the A/D converter and is composed of at least two IIR filters placed in cascade, one of these IIR filters being a non-causal filter with conjugate spectrum to the other IIR filter, and of an FIR filter in series suitable for correcting the filtering resulting from the IIR filters and for delivering an output signal whose phase is proportional to frequency.

Preferably, each IIR filter is a semi-Nyquist or substantially semi-Nyquist filter.

The IIR and FIR filters are combined in such a way as to reduce the signal dynamic swing and to use the same dynamic swing everywhere. Advantageously the non-causal IIR filter comprises video signal sampling means, means for chopping the sampled video signal into sections of predetermined length of time LT, means of time inversion of the samples of the chopped sections before filtering, and second means of time inversion of the filtered samples. Preferably, each means of time inversion of the samples before and after filtering consists of an LIFO stack (last in, first out).

Preferably, the non-causal IIR filter includes two parallel pathways, each pathway including an identical IIR digital filter, and being linked, upstream, to a router means, operating at a clock rate equal to L times the sampling period T, provided for alternately linking a pathway and its filter to the output of the LIFO situated upstream and for linking the other pathway and its filter to a source of zeros, whilst a second router means situated downstream of the two parallel IIR filters is provided for alternately linking the output of the filter which receives the time reverse samples of the chopped section to a delay cell introducing a delay of 2 LT, the output of this delay cell being linked to an input of an adder whose other input is linked, via the second router means, to the output of the filter which receives the zeros, the output of the adder being linked to the second LIFO stack which re-establishes the time order of the filtered samples.

The number L is chosen such that the duration LT is sufficient for the amplitude of the filtered signal at the end of the passing of the sequence of zeros to be negligible.

Preferably the FIR filter and the IIR combined filter (consisting of several IIR filters) are split up into filtering cells in such a way that the polynomial of the overall transfer function for each FIR and IIR filter is equal to the product of several polynomials of lower order, the overall transfer function of the circuit being formed by a fraction whose numerator is a polynomial corresponding to the FIR filter, whilst the denominator is a polynomial corresponding to the IIR filter.

Advantageously the FIR filter is split up into five cells each having a transfer function of order four, whilst the IIR filter is split up into three cells with transfer function of order two.

Advantageously, the coefficients of the FIR filter cells are as follows:

$\beta^{(1)}_k = [377, 638, 1024, 638, 377]$ $\beta^{(2)}_k = [94, 349, 512, 349, 94]$ $\beta^{(3)}_k = [71, 177, 256, 177, 71]$ $\beta^{(4)}_k = [34, 159, 256, 159, 34]$ $\beta^{(5)}_k = [19, -155, 512, -155, 19]$, whilst the coefficients of the IIR filter cells are as follows:

$\alpha^{(1)}_k = [76, 128, 63]$ $\alpha^{(2)}_k = [128, 82, 114]$ $\alpha^{(3)}_k = [128, 62, 66]$.

The invention consists, apart from the provisions set forth above, of a certain number of other provisions which will be more explicitly alluded to below in connection with a particular example described with reference to the appended drawings but which is in no way limiting.

FIG. 1, of these drawings, is a diagram of a circuit for processing IF intermediate frequency video signals originating from a tuner, including the filtering circuit in accordance with the invention.

FIG. 3A is a diagrammatic chart representing the signals at the input of the A/D converter.

FIGS. 3B and 3C illustrate the effects of the sampling on the signal of FIG. 3A.

FIG. 3D is a chart illustrating the signals at the output of the Nyquist filter.

FIG. 4A reuses the chart of FIG. 3D.

FIG. 4B is a chart illustrating just the signals delivered at the output of the Nyquist filter.

FIG. 4C illustrates the regeneration of the picture carrier.

FIG. 4D is a chart illustrating the signals after regeneration of the picture carrier, together with the chart of the low-pass filter.

FIG. 4E is a diagram of the signals at the output of the low-pass filter.

Figure 5:
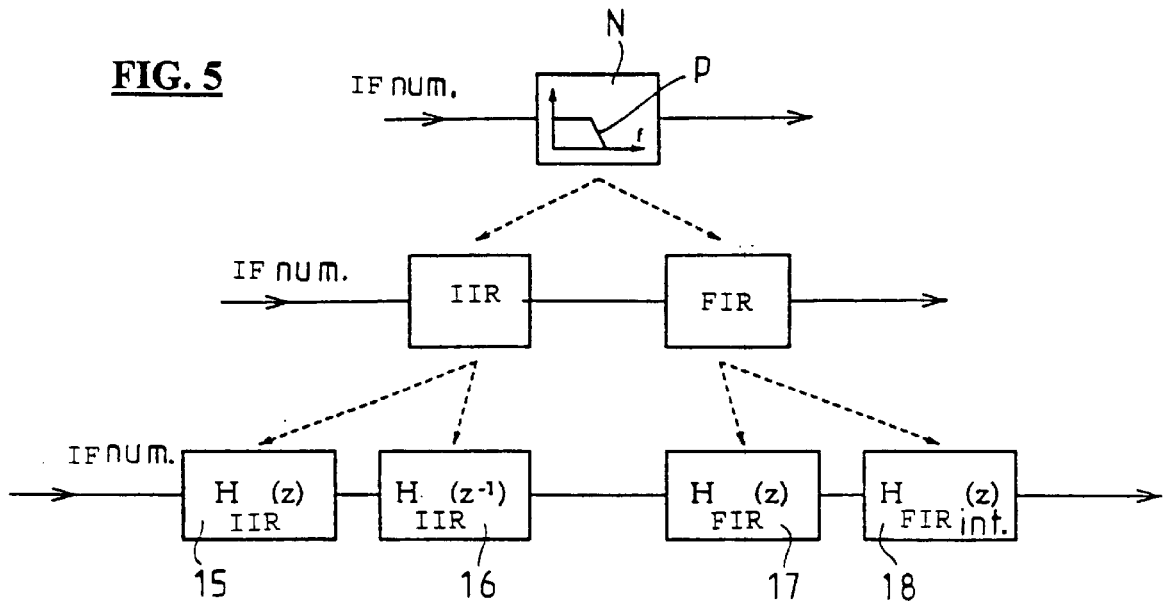

FIG. 5 is a diagram illustrating the construction of the Nyquist filter according to the invention.

Figure 6:
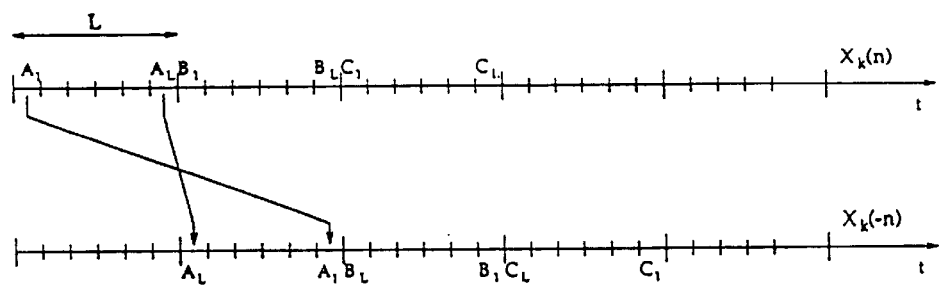

FIG. 6 is a diagram illustrating the time inversion of a string of samples by an LIFO stack.

Figure 7:
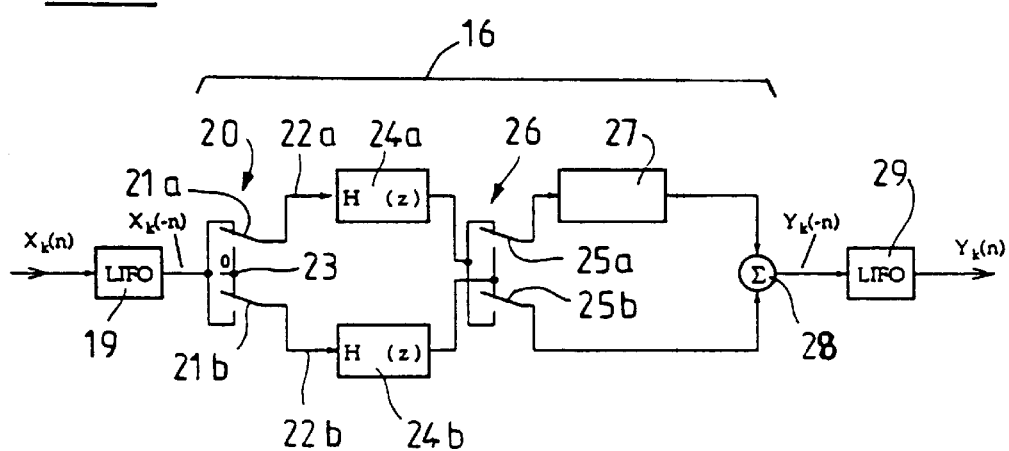

FIG. 7 is a diagram illustrating the construction of a non-causal IIR filter.

Figure 8:
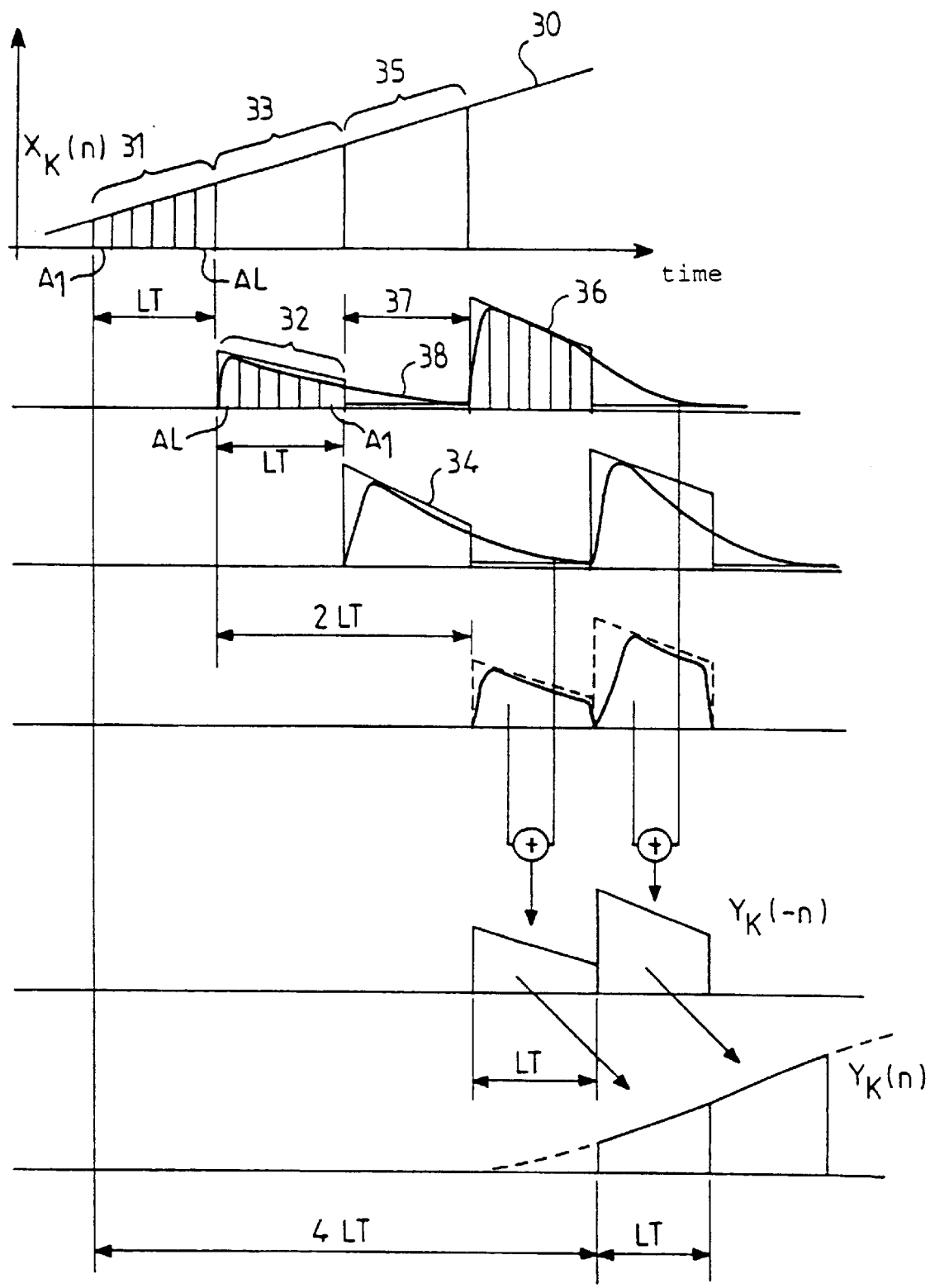

FIG. 8 is a set of simplified diagrams illustrating the processing of a signal by the non-causal filter of FIG. 7.

Figure 9:
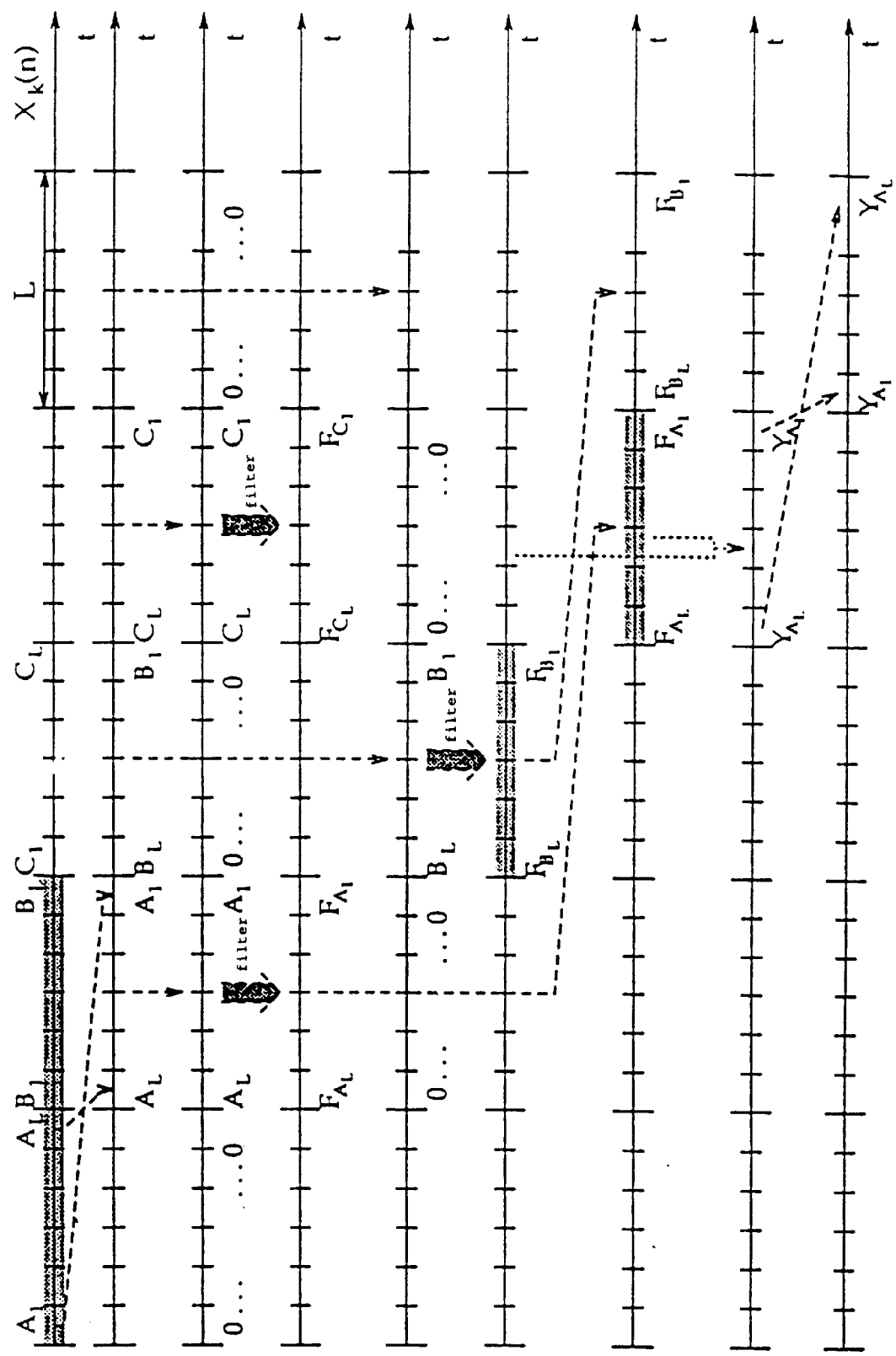

FIG. 9 is a set of time charts illustrating, in a form different to FIG. 8, the operation of the non-causal filter of FIG. 7.

Figure 10:
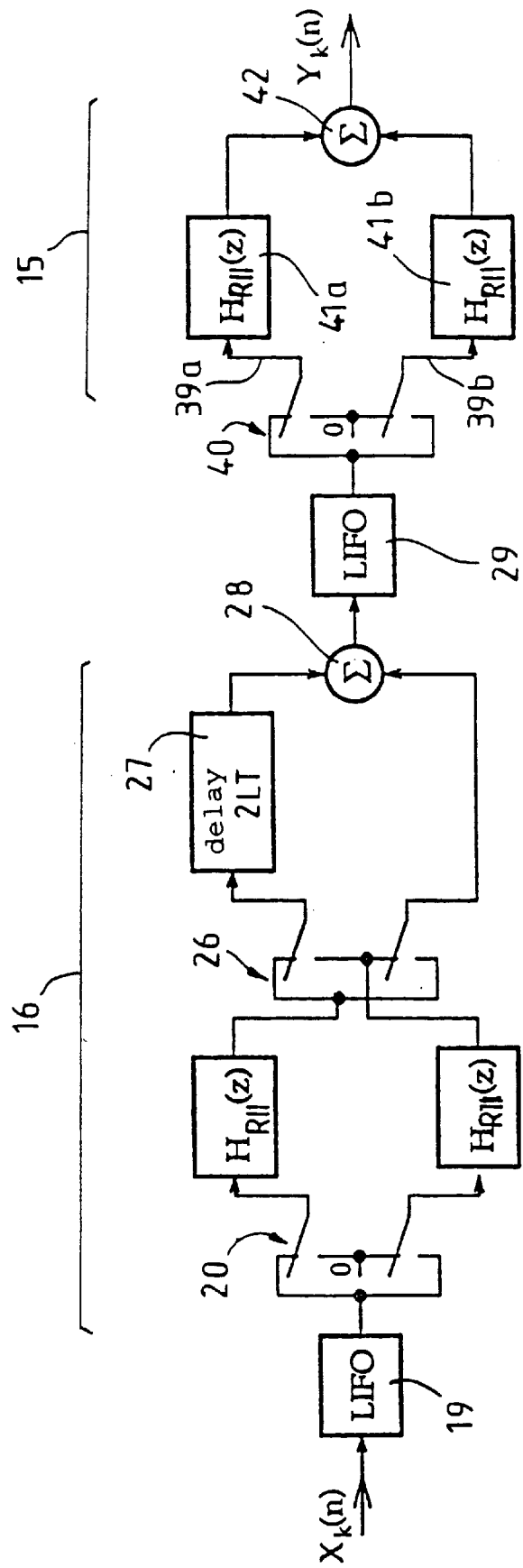

FIG. 10 is a diagram of the cascaded IIR filtering assembly comprising the non-causal filter of FIG. 7 and the conjugate spectrum IIR filter.

Figure 11A:
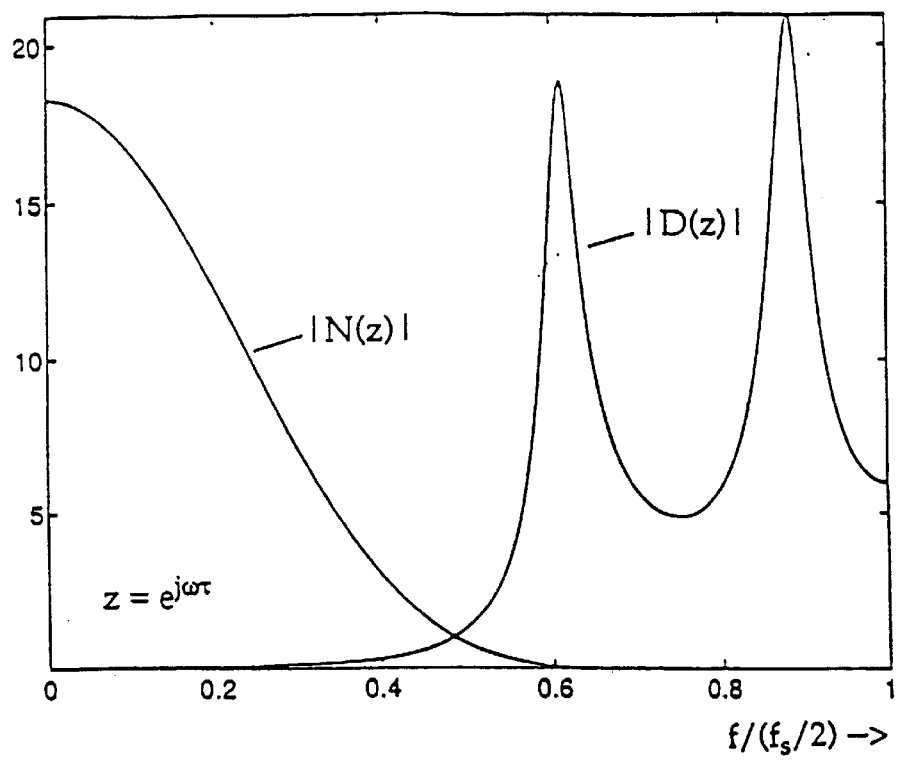

FIG. 11A is a chart illustrating the frequency responses of the FIR filter and of the IIR filter.

Figure 11B:
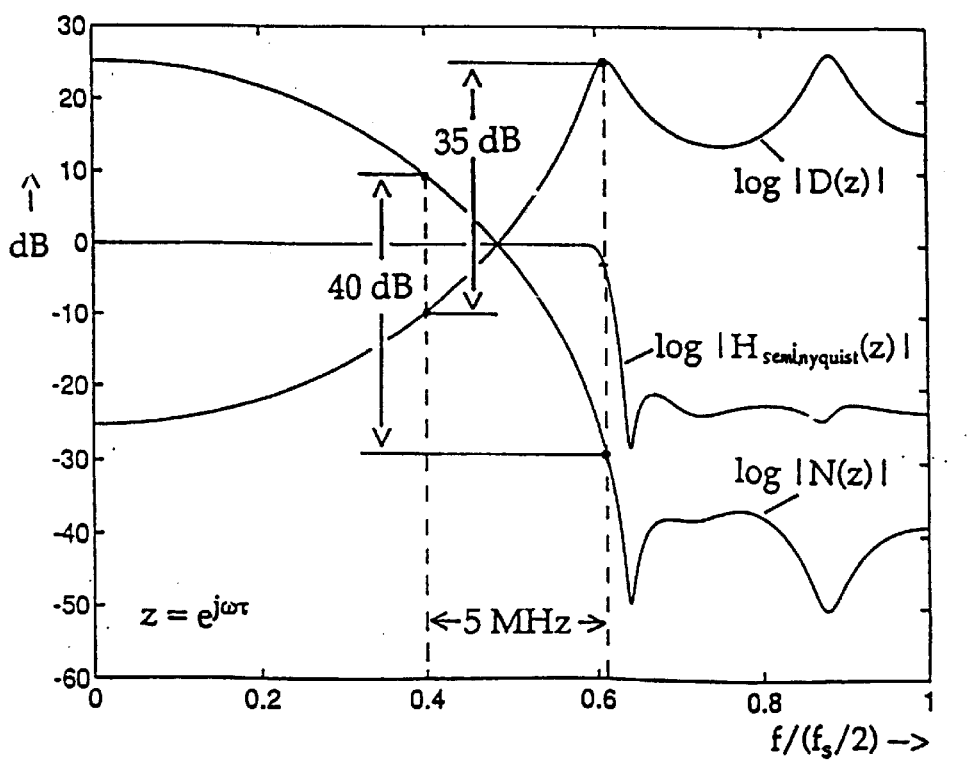

FIG. 11B also illustrates the frequency responses of the filters but with a logarithmic scale as ordinate, the sum of the two filters being also represented in this diagram.

Figure 12A:
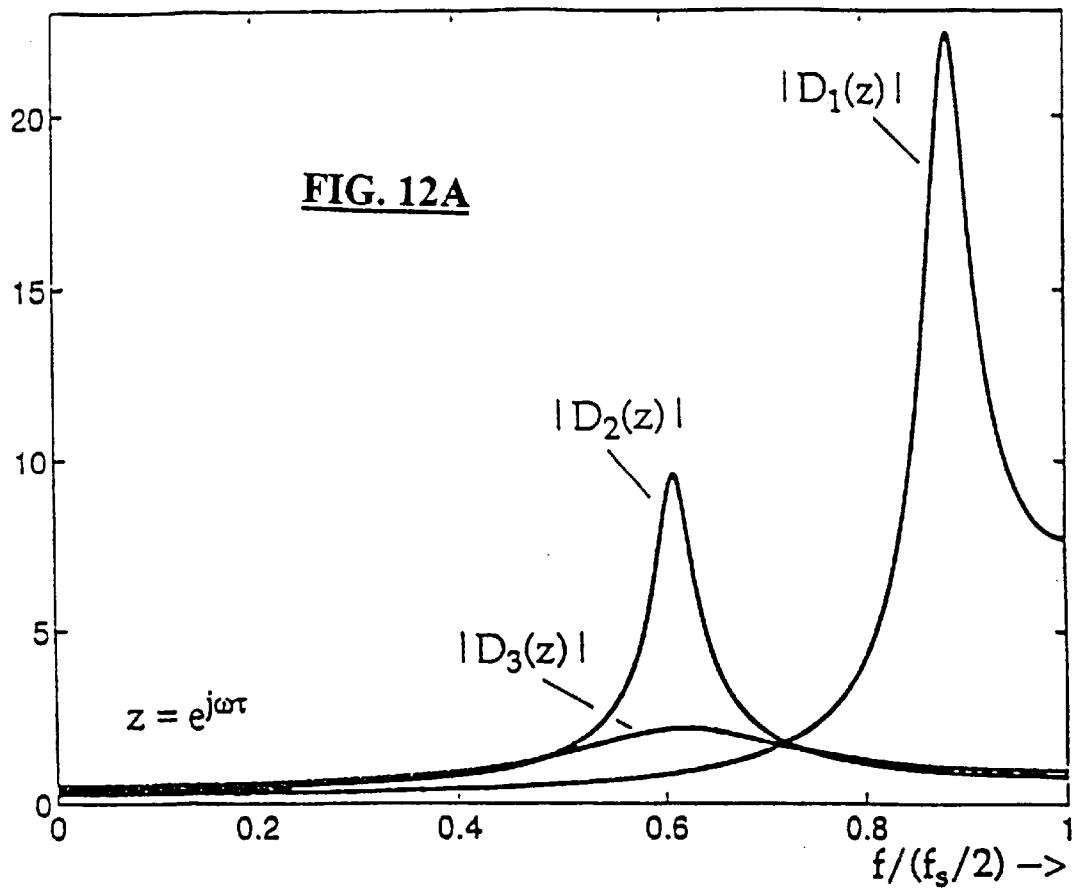

FIG. 12A illustrates the frequency responses of each of the three individual cells of the IIR filter.

Figure 12B:
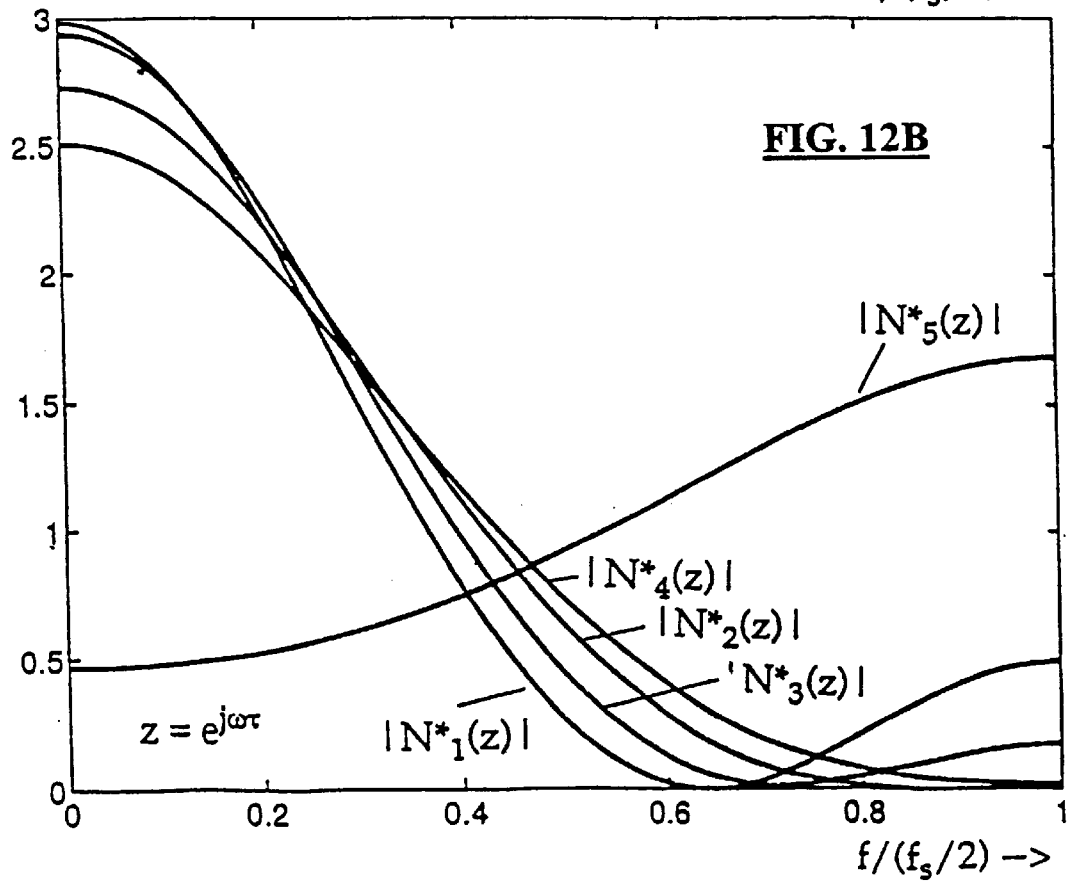

FIG. 12B illustrates the frequency response of each of the five cells of the FIR filter.

Figure 13A:
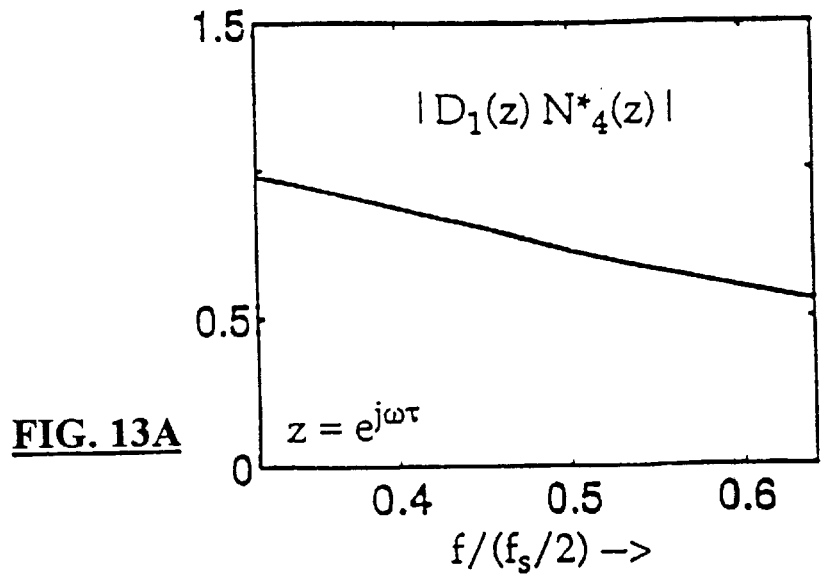
Figure 13B:
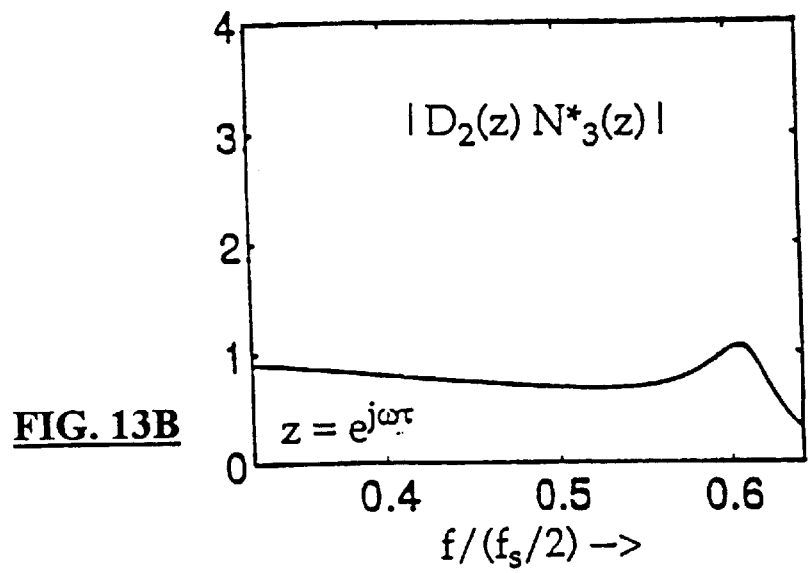
Figure 13C:
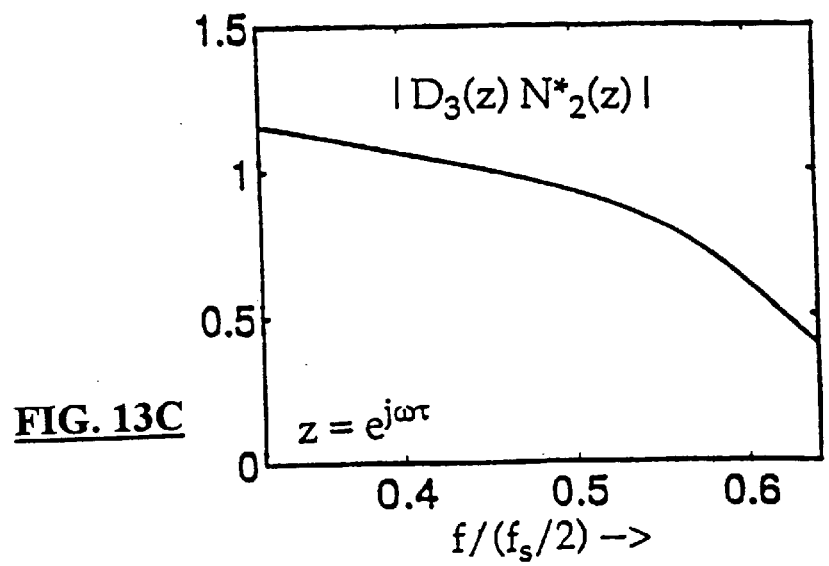

FIGS. 13A to 13C illustrate the frequency responses of various combinations of the IIR filter cells and FIR filter cells.

Figure 14A:
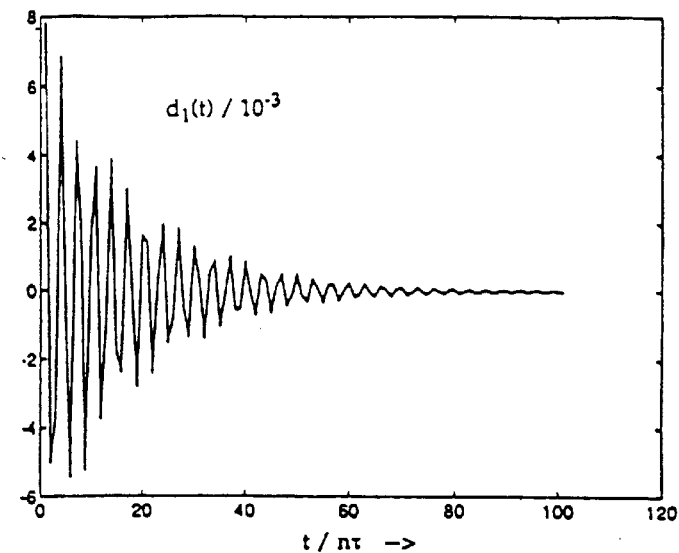
Figure 14B:
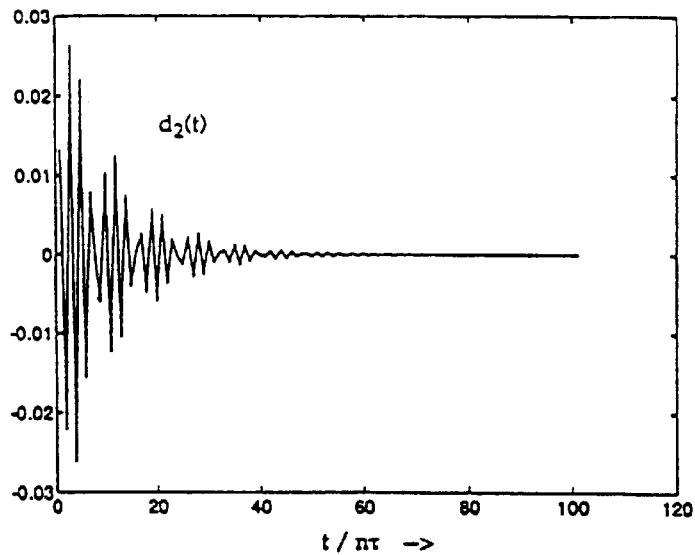
Figure 14C:
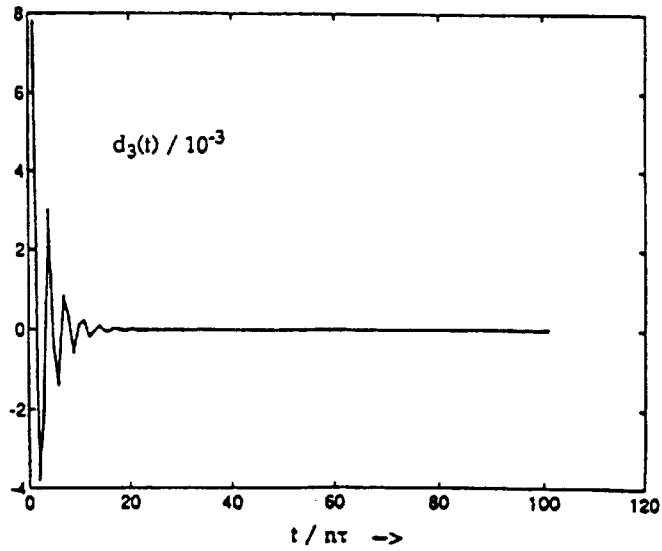

FIGS. 14A to 14C illustrate the impulse responses of the filtering assembly at the characteristic frequency of the three cells of the IIR filter.

Figure 15A:
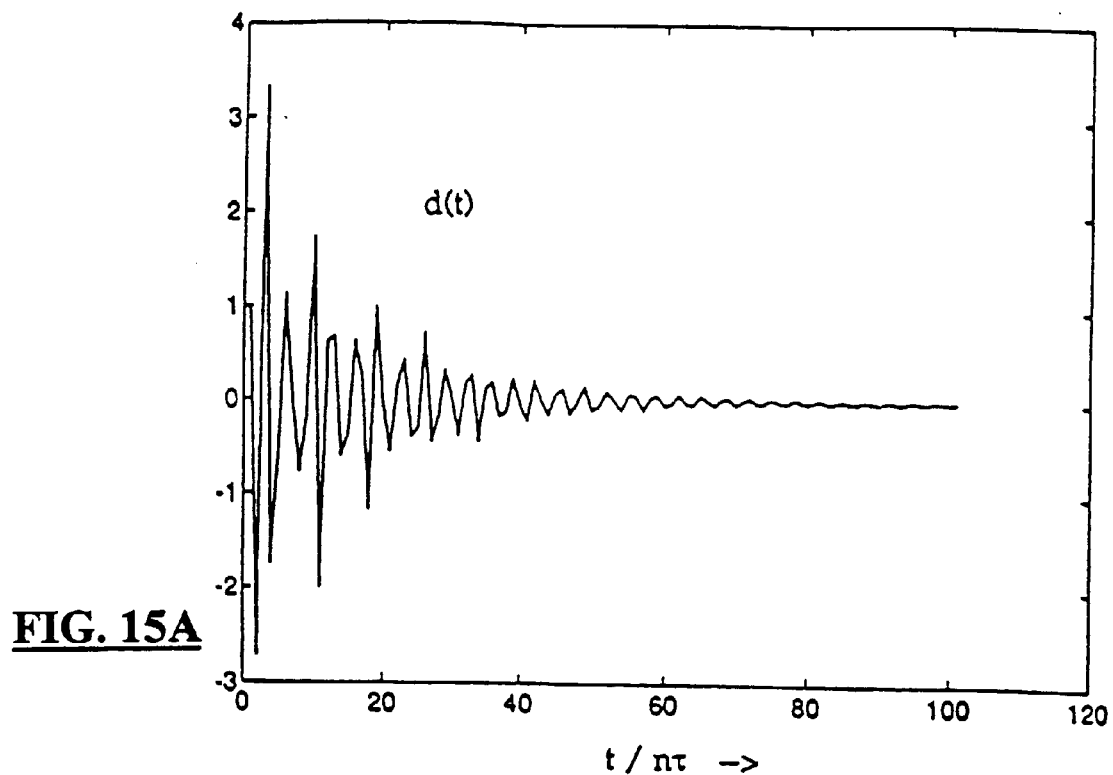

FIG. 15A gives the result of convolving the three IIR filter cells.

Figure 15B:
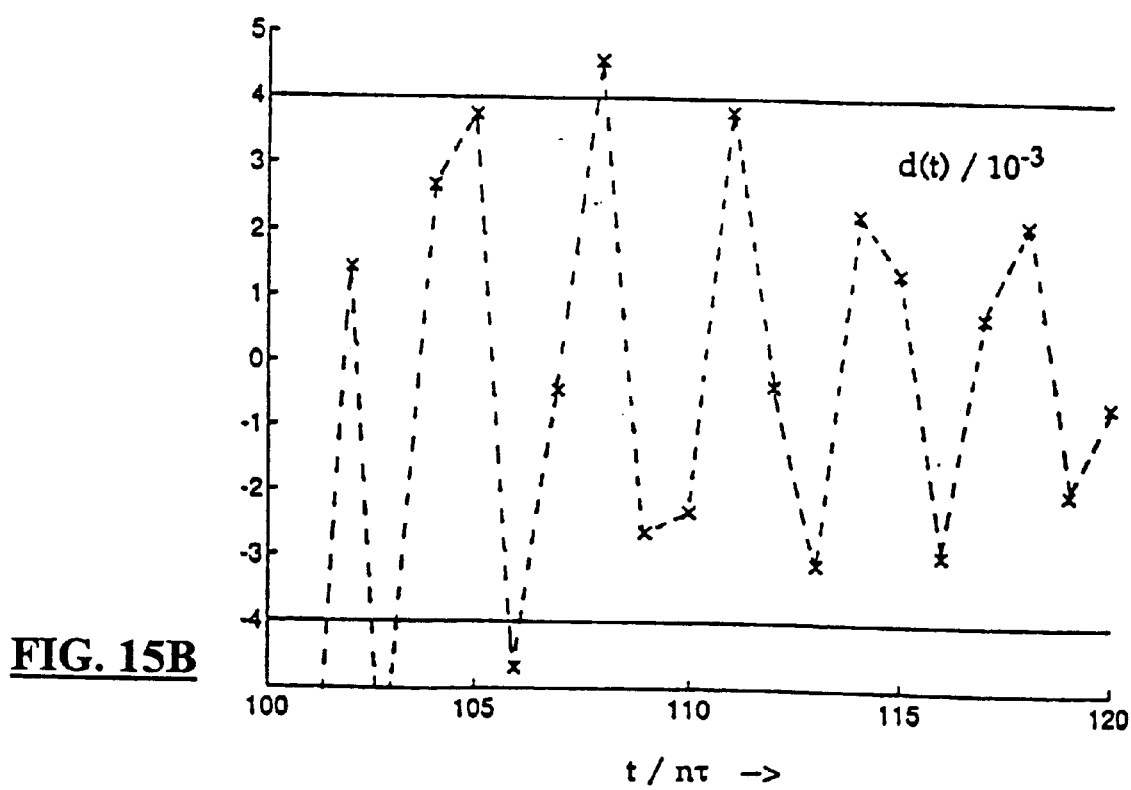

FIG. 15B is a chart illustrating, with an ordinate scale multiplied by one thousand, the end of the signal resulting from the convolving of FIG. 15A.

FIG. 16 is a diagram of the digital Nyquist filter according to the invention.

FIG. 17 is a diagram of a variant embodiment of the Nyquist filter according to FIG. 16.

Figure 18B:
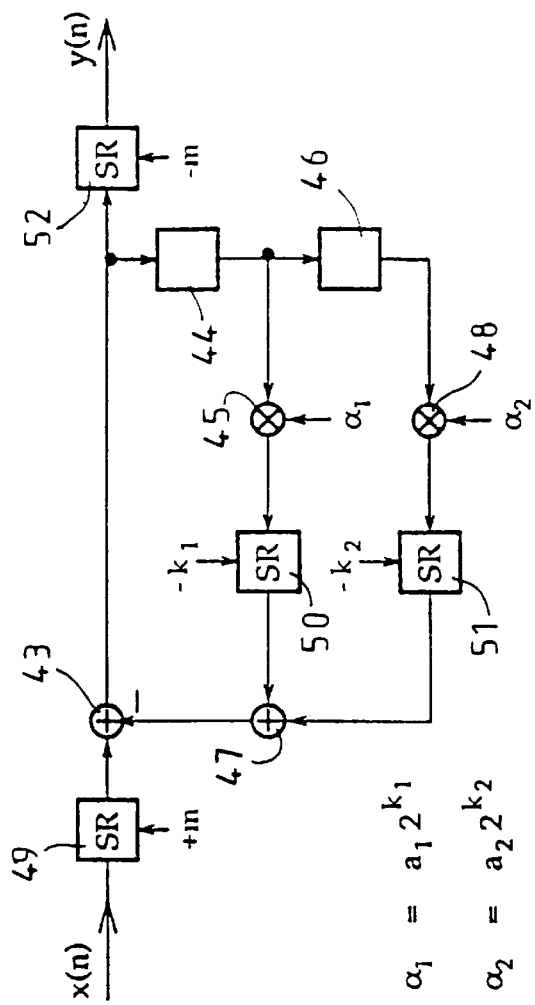
Figure 18A:
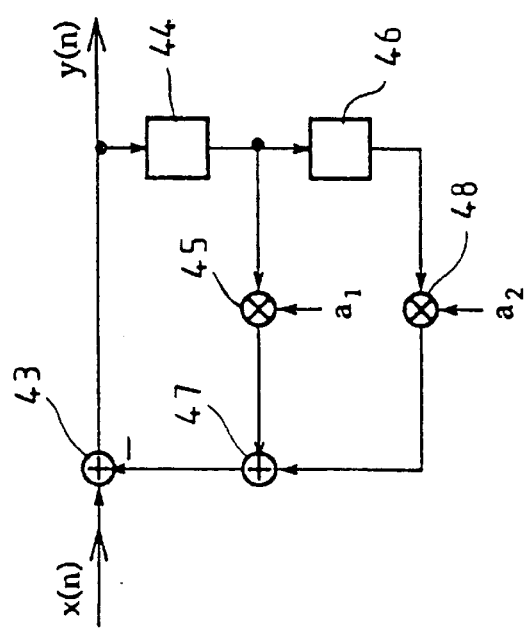

FIGS. 18A and 18B are diagrams of IIR filter cells.

Figures 19A, 19B:
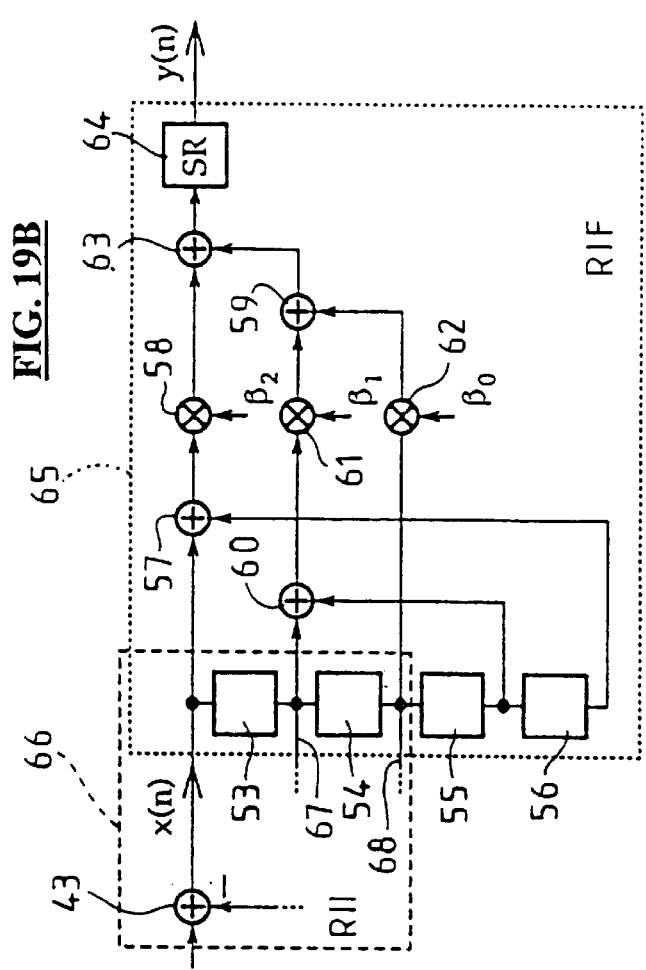

FIGS. 19A and 19B, finally, are diagrams of FIR filter cells.

Figure 1:
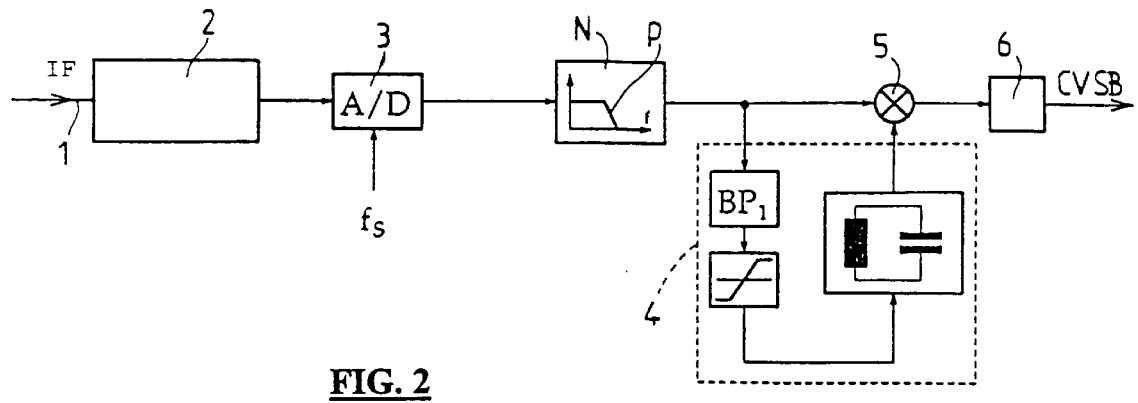

On referring to FIG. 1 of the drawings there may be seen a circuit for processing IF intermediate frequency video signals originating from a tuner (not represented). The circuit portion of FIG. 1 comprises a digital Nyquist filter N whose assembly diagram is given in FIG. 5 and the detailed description of which will be given later, after recalling the definition of the Nyquist filter.

Analysis of the operation of the IF circuit shows a large dynamic range in respect of the processing of IF analog signals. In order to carry out selection of the desired channel, from among the IF signals arriving on the input line 1, a bandwidth adaptable analog prefilter 2 is employed. The output of this prefilter 2 is linked to an A/D (analog/digital) converter 3 which works at a sampling frequency $f_s$. The digital signals from the converter 3 are sent to the Nyquist filter N and a portion of the signal leaving the filter N is sent to a circuit 4 for regenerating the picture carrier whose output is linked to an input of a multiplier circuit 5. Another input of the circuit 5 receives the signal originating from the filter N directly. The signal leaving the circuit 5 is sent to a low-pass filter 6 whose output delivers the composite video sideband signal (CVBS).

The separation between channel selection, carried out by the analog prefilter 2, and Nyquist filtering has an advantage in respect of automatic frequency control (AFC), not shown in FIG. 1, which plays an important role in synchronous demodulation. Together with a setting of the Nyquist slope p under digital control, AFC can operate much better. After synchronous demodulation carried out downstream of the filter N, and after the low-pass filter 6, the composite video sideband signal (CVBS) becomes available.

The sampling frequency $f_s$, at the level of the converter 3, is an important parameter which predetermines the performance achievable under economic conditions. It should be chosen with great care, since as results from the explanations which follow, this frequency cannot be chosen at will.

Figure 2:
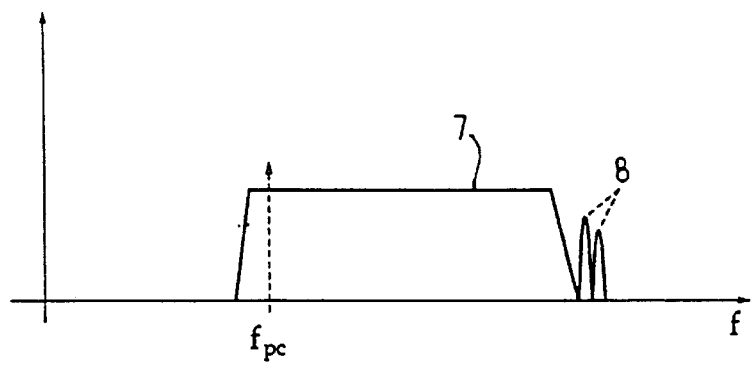
FIG. 2 is a diagram of the analog IF signal at the output of the analog prefilter.

For better understanding, the spectrum of the analog IF signal leaving the prefilter 2 is shown in FIG. 2 the amplitude being plotted as ordinate, and the frequency as abscissa. Contrary to the customary representation of IF spectra, its orientation is inverted, the components with customarily higher frequency corresponding to the video band 7 around the picture carrier frequency $f_{pc}$ appear here as being the lower frequency components, whilst the components of the sound band 8, customarily of lower frequency, appear here as being higher. The inverted orientation of the IF spectrum represented in FIG. 2 is due to the analog pre-processing and is of no importance for the problem at hand.

Examination of the IF spectrum obtained suggests a certain application of a subsampling technique. In order to some extent to tolerate the imperfections of the analog prefilter 2, relating to the suppression of the channels adjacent to the desired channel, the sampling frequency $f_s$ should not be chosen too small. A fully occupied frequency spectrum in which the repeated IF spectra, arising from the sampling, leave no frequency interval between them, should be avoided. Frequency intervals equally spaced between the periodically repeated spectra will be obtained if the sampling frequency $f_s$ satisfies the condition $$f_s = f_{IFmax} + (f_{IFmax} - 2B_{CH})/3$$

$$f_s = (4f_{IFmax} - 2B_{CH})/3$$

with $$f_{IFmax:norm\ B/G} = f_{PC:norm\ B/G} + f_{VSB:norm\ B/G}$$

$f^{PC}$=frequency of the carrier $f_{PC:norm\ B/G}$=38.9 MHz, $f_{VSB:norm\ B/G}$=1.25 MHZ, $B_{CH:norm\ B/G}$=7 MHz $f_{IFmax:norm\ B/G}$=40.15 MHZ It follows that $f_s$=48.87 MHz.

FIGS. 3A to 3D give an illustration of the proposed subsampling technique. The input signal to the A/D converter 3 is represented by the selected IF signal 7, 8 in FIG. 3A with a final bandwidth of $B_{CH}$. The bandwidth required for a sample-and-hold unit belonging to the converter 3 has been represented in FIG. 3A in the form of a trapezoidal dashed line. In FIGS. 3A to 3D, as in FIG. 2, the amplitude of the IF signal is plotted as ordinate and the frequencies are plotted as abscissa. When the sampling frequency corresponds to the maximum IF frequency, namely $f_{IFmax}$, the sampling at this frequency results in the spectrum illustrated in FIG. 3B with unequal intervals between the IF repeated spectra. FIG. 3B already represents an extreme case in which the frequency interval around the zero frequency is decreasing.

Examination of the frequency interval between "the baseband" and the first repeated spectrum suggests that this space of amplitude $f_{IFmax}.-2B_{CH}$ should be divided into thirds about the zero frequency as shown in FIG. 3C. Consequently, the sampling frequency should be increased by $(f_{IFmax}-2B_{CH})/3$ as has been done earlier.

The Nyquist frequency at 6 dB of the resulting picture carrier can now be calculated:

$$f_{6dB}=f_s-f_{PC\ inverted}$$

with $$f_{PC\ inverted}=f_{IFmax}-B_{CH}+f_{VSB}=34.4\ MHz$$

this becomes $$4_{6dB}=48.87\ MHz-34.4\ MHz=14.47\ MHz.$$

A possible form of the characteristic of the digital Nyquist filter is represented as a continuous thick line 10 in FIG. 3D. It is recalled that the slope p which limits the passband 11 of the Nyquist filter around the higher frequencies cuts the carrier frequency or its transpose 12 midway up. This makes it possible, as explained with regard to FIG. 4D, after demodulation regeneration of the picture carrier, to avoid signal distortion.

In order to allow subsequent synchronous demodulation, the Nyquist filter should also possess an oversampling characteristic which suppresses at least the first IF repeated spectrum.

FIGS. 4A to 4E illustrate the process which makes it possible to arrive in FIG. 4E at the demodulated video signal of the selected channel.

FIG. 4A reuses FIG. 3D and illustrates the resulting signal after passing through the Nyquist filter whose frequency response chart is represented by thick lines comprising segments parallel to the abscissa axis bounded by relatively steep slopes p cutting the carrier midway up. FIG. 4B illustrates the signal at the output of the Nyquist filter, the video band 7 being bounded by the Nyquist slope p.

FIG. 4C illustrates the regenerated picture carrier.

FIG. 4D illustrates the signals after demodulation, subjected to low-pass filtering having a frequency response represented by the thick line curve 13. It will be noted that the two Nyquist slopes p of video bands inverted about the zero frequency intersect midway up and make it possible, by addition, to obtain a segment parallel to the frequency axis and to avoid distortion.

FIG. 4E shows specifically the reconstructed composite video sideband signal, together with the modulated sound signals, at the output of the low-pass filter.

FIG. 5 illustrates diagrammatically the construction of the Nyquist filter according to the invention. The filter N has been represented in the first line of FIG. 5. A first indication regarding the makeup of this filter N is given by the second line of FIG. 5 in which it may be seen that the filter N comprises in series an infinite impulse response IIR filter (or set of filters) and a finite impulse response FIR filter.

The third line of FIG. 5 shows that the IIR filter, regarded as a whole, is split up into two cascaded IIR filters 15, 16. The FIR filter can also be split up into two cascaded FIR filters 17, 18. However, the filter 18 intended for oversampling is not indispensable.

In general, an IIR filter offers, in video applications, an unacceptable group delay characteristic. To compensate for the nonlinear phase characteristic of the IIR filter 15, with transfer function H(Z) (with $Z=e^{j\omega r}$), a cascaded conjugate spectrum IIR filter 16 is provided, having a time-inverted functionality. The filter 16 should therefore be a non-causal filter.

It is recalled that the property of causality conveys the fact that in a real filter the output cannot precede the input in time.

The filter 16 with spectrum conjugate to the filter 15 should exhibit a property inverse to that of causality. The construction of this non-causal filter will be explained a little later.

The FIR filter 17 and optionally the FIR filter 18 are designed to make a frequency correction to the cascaded IIR filters 15, 16.

The IIR filtering assembly, with the non-causal filter 16, is now considered.

The transfer function $H_{res}(Z)$ resulting from the two cascaded filters 15, 16 can be expressed as follows:

$$H_{res}(Z)=H(Z)\ H(Z^{-1})=H(Z)\ H(Z)^*=|H(Z)|^2$$

Since this resultant transfer function corresponds to a real number, the overall linear phase characteristic is then ensured, this being an absolutely essential prior condition for video applications. Unfortunately, the transfer function $H(Z^{-1})$, or non-causal transfer function, cannot be achieved in its ideal form.

According to the invention, an approximation is made possible by using a technique of local time inversion and a method of sectioned convolution in a single pass.

To carry out the time inversion of the digital signals $X_k(n)$ there is provided, as shown in FIG. 7, an LIFO (last in, first out) stack 19 which therefore allows time inversion of the samples $A_1 \ldots A_L$ of a section of length, in time, equal to LT, T being the sampling period in the A/D converter 3, which includes the video signal sampling means. The number L of samples for a section will be specified later.

Thus, as illustrated by the diagram of FIG. 6, the samples $A_1 \ldots A_L$ of the signal section $X_k(n)$ entering the stack 19 stand in time-inverted order at the output of this stack, as shown in the second line of FIG. 6 in which the last sample input $A_L$ is placed at the start of the inverted exiting section; the segment (or sample) $A_1$ which was at the start of the section on entry, is, on exit, placed at the end of this section. The same holds for the samples of the following sections $B_1 \ldots B_L$, inverted into $B_L \ldots B_1$ and for $C_1 \ldots C_L$ inverted into $C_L \ldots C_1$.

FIG. 7 gives the diagram of the IIR non-causal filter 16.

This filter includes the LIFO stack 19 already mentioned which can store L samples. The output of the stack 19 is linked to a router means 20, represented diagrammatically, which comprises two switch elements 21a, 21b provided respectively on two parallel pathways 22a, 22b. A source 23 for transmitting zero signals is moreover provided. The output of the stack 19 is linked, in parallel, to a terminal of each of the switches 21a, 21b, whilst the source 23 of zeros is linked to the other terminal of these switches. These switches 21a, 21b operate at a clock rate whose period is equal to L times the sampling period T in the A/D converter 3. The router means 20 can take two configurations: the first, illustrated in FIG. 7, links the output of the stack 19 to the pathway 22a and to the input of an IIR filter 24a; in this configuration, the other switch 21b links the source of zeros 23 to the other pathway 22b which is linked to the input of an IIR filter 24b, advantageously identical to the filter 24a. The router means 20 can take a second configuration in which the switch 21a links the source 23 to the pathway 22a whilst the switch 21b links the output of the stack 19 to the pathway 22b.

The output of the filter 24a is linked in parallel to a terminal of a first switch 25a and to a terminal of a second switch 25b belonging to a second router means 26. The output of the filter 24b is linked in parallel to the other two terminals of the switches 25a, 25b. The switch 25a is linked to the input of a delay cell 27 suitable for introducing a delay of 2 L times the sampling period T of the converter 3 (namely 2 LT); the output of the delay cell 27 is linked to an input of an adder circuit 28. The other switch 25b is linked directly to another input of the adder circuit 28. The router means 26 operates at the same clock rate as the router means 20, the switches 25a, 25b modifying the connections at this rate. In a first configuration of the router means 26, illustrated in FIG. 7, the switch 25a links the output of the filter 24a to the input of the delay cell 27, whilst the switch 25b links the output of the filter 24b directly to the adder circuit 28. In the second configuration, the connections are inverted by changing the setting of the switches 25a, 25b.

The signals $Y_k(-n)$ exiting the adder circuit 28 are sent to the input of a second LIFO stack 29, similar to the stack 19, which performs a new time inversion of the signals and restores, at output, signals $Y_k(n)$.

FIG. 8 is a succession of charts diagrammatically illustrating the processing of the signals at various junctures in the circuits of FIG. 7.

Represented in the first line of this FIG. 8, for simplicity, is an IF signal 30 whose amplitude increases linearly with time. The signal 30 is divided into sections 31, 33, 35, . . . of equal duration LT. The samples $A_1 \ldots A_L, B_1 \ldots B_L$ of this signal, at the output of the converter 3, are denoted overall as $X_k(n)$. The first group 31 of L samples is time-inverted by the stack 19 which gives, as output, on the pathway 22a, the group 32 of the second line of FIG. 8, delayed by LT (L times the sampling period).

At the end of this group 32, the router 20 changes configuration, and the following group 33 of the first line of FIG. 8 is sent to the second pathway 22b, to give the group 34 (of the third line of FIG. 8) whilst, during this time, the first pathway 22a receives zero signals. Then the third group 35 of the first line of FIG. 8 is again sent to the pathway 22a to form the group of time-inverted samples 36, whilst the pathway 22b receives zero signals.

Represented in thick lines in the second and third lines of FIG. 8 is the shape of the signals at the output of the filters 24a, 24b. It will be noted, in the second line, that the series of zeros which follows the group 32 over a duration LT, and which is represented by the segment 37, enables the output signal 38 from the filter 24a, which continues to decrease after the last sample of the group 32, to attain a very small value close to zero. The number L is chosen such that the length LT of the segment 37 is sufficient for the "trail" 38 of the output signal from the filter 24a or 24b, after the last pulse of a group such as 32, to be substantially zero at the conclusion of LT.

The fourth line of FIG. 8 illustrates the time shift created by the cell 27 which delays by 2 LT the groups of filtered samples 32, 34, 35 . . .

The fifth line of FIG. 8 illustrates the addition operation carried out in the circuit 28. The output, delayed by 2 LT, from the filter 24a and corresponding to the group of samples 32, is added to the trail of the output signal from the filter 24b, following the group of samples 34. Similarly, the output from a group of samples filtered by the filter 24b will be added to a trail of the filter 24a. The fifth line of FIG. 8 illustrates diagrammatically the signals $Y_k(-n)$ obtained at the output of the adder 28.

The LIFO stack 29, by inverting the signals $Y_k(-n)$ in time, returns a filtered signal $Y_k(n)$ shown diagrammatically in the last line of FIG. 8, each group being delayed by LT by the stack 29.

FIG. 9 illustrates, in the form of charts, the above explanations. It may be seen that the sections of samples $A_1 \ldots A_L; B_1 \ldots B_L; C_1 \ldots C_L$ are firstly inverted in time as illustrated in the second line.

Next, the router means 20 send the inverted sections $A_L \ldots A_1, C_L \ldots C_1$ over the line 22a, with interposition of sections consisting of L zeros, as illustrated in the third line of this FIG. 9.

The fourth line of FIG. 9 corresponds to the filtered signals $F_{AL} \ldots F_{A1}$ at the output of the filter 24a. The fifth and sixth lines of FIG. 9 are similar to the third and fourth lines but, for the case of the sections $B_L \ldots B_1$, are shifted in time by LT with respect to the sections $A_L \ldots A_1, C_L \ldots C_1$.

The seventh line of FIG. 9 illustrates the delay of 2 LT introduced by the cell 27 into the filtered signals.

The eighth line of this FIG. 9 illustrates diagrammatically the addition carried out in the circuit 28 between a section of filtered signals and a "trail" of the output of the other filter upon the section of zeros sent to the input. $Y_{AL} \ldots Y_{A1}$ correspond to the results of the addition.

The last line of FIG. 9 illustrates the new time inversion of the sample sections $Y_{AL} \ldots Y_{A1}$, effected by the LIFO stack 29.

As may be seen, the single-pass sectioned convolution method uses the overlap-add method which provides that the impulse response be at least of finite duration LT (T=sampling period of the converter 3), this being only approximately true for IIR filters. In this case, the output signal from the filter (inverted in time) is given by the formula $$y_k(-n) = h(n) * x_k(-n) + h(n) * x_{k+1}(-n).$$

with $$y_k(n), x_k(n) = \begin{cases} y(n), x_k(n) & \text{for } kL \le n \le (k+1)L, \\ 0 & \text{otherwise.} \end{cases}$$

According to the above formula the time convolution for obtaining $y_k(-n)$ can be interpreted as two sections of output consisting of a driving response $(h(n) * x_k(-n))$ and a trailing response $(h(n) * x_k+1(-n))$.

This corresponds to the architecture described in connection with FIG. 7 and the operation of which has been explained with reference to FIGS. 8 and 9.

With regard to the forward time convolution of the causal filter 15, with transfer function H(Z), it may consequently be found that:

$$y_k(n)=h(n)*x_k(n)+h(n)*x_{k-1}(n).$$

FIG. 10 shows the complete filter architecture of a linear-phase IIR filtering assembly according to the invention.

The non-causal filter 16, explained in detail earlier, is cascaded with the causal filter 15 which comprises a parallel structure with two pathways 39a, 39b linked respectively to two switches of a router 40 similar to the routers 20 and 26 and operating at the same frequency. The router 40 makes it possible alternately to link the pathways 39a, 39b to the output of the LIFO stack 29 and to a source of zeros. Each pathway 39a, 39b includes an identical IIR filter 41a, 41b whose output is linked to an input of an adder circuit 42. The filter 15 made up in this way makes it possible to carry out the forward time convolution corresponding to the equation above.

If the limit cycle or if the overshoot oscillations pose no problems, the forward time convolution can even be simplified by using a single IIR filter, for example 41a, in place of the parallel structure illustrated in FIG. 10.

Taking the above formulae into account, it emerges that when wishing to construct a Nyquist filter with the two cascaded IIR filters 15 and 16, it is necessary to satisfy the following relation between the transfer functions H(Z) for the filter 15, and $H(Z^{-1})$ for the filter 16, $$H(Z) H(Z^{-1}) = H_{Nyquist}(Z)$$

This implies $H(Z) = H_{semi-Nyquist}(Z)$.

Experience has shown that a semi-Nyquist filter cannot be constructed entirely around the design of an IIR filter and that an FIR finite impulse response filter portion must be appended as shown diagrammatically in the third line of FIG. 5 with the filter 17 and, if appropriate, the filter 18.

It is apparent that even the FIR filter portion outweighs the IIR portion as regards the order of the filter.

The transfer function for the semi-Nyquist filter of the invention can be expressed as follows:

$$H_{semi-Nyquist}(Z) = N(Z)/D(Z),$$

in which formula N(Z) and D(Z) represent numerator and denominator polynomials of the transfer function of the semi-Nyquist filter. The minimum order of the polynomials of the numerator and of the denominator could amount to 10 and 6, respectively.

FIG. 11A shows the resulting frequency responses of the FIR and IIR filter portion. Whereas the FIR filter portion which corresponds to the curve N(Z) shows a low-pass characteristic over the whole of the passband region, the curve D(Z) which is the response of the IIR filter portion shows strong attenuation in the passband of the FIR filter, and a few resonant frequencies in the region of the stop band of the FIR filter.

The logarithmic representation, given in FIG. 11B, of the frequency responses of FIG. 11A depict how the two filter portions N(Z) and D(Z) can give a semi-Nyquist filter. The flat passband characteristic and the semi-Nyquist transition step are due principally to the antagonistic behaviour of the two types of filter. The two types of filter contribute substantially equally to the overall behaviour.

On examining the IIR and FIR filtering characteristics more closely, a serious problem emerges associated with the hardware construction of such types of filters. As shown in FIG. 11B, in the region of the passband over a bandwidth of around 5 MHz, there is a variation in gain of around 40 dB in respect of the FIR filter portion and of around 34 dB in respect of the IIR portion. Now also taking into account the arrangement of FIG. 5, the dynamic range of the digital signal path after the two cascaded IIR filters 15, 16 and before the following FIR filter 17 should be increased by 70 dB. From this it may be concluded that, firstly, the filter arrangement proposed in FIG. 5 is merely a simplified diagram and that, secondly, the filtering polynomials N(Z) and D(Z) should be split up into smaller filtering cells.

Computer simulation trials have shown that satisfactory results are obtained with:
for the FIR filter:

$$N(Z) = N_1(Z) N_2(Z) N_3(Z) N_4(Z) N_5(Z)$$

and for the IIR filter:

$$D(Z) = D_1(Z) D_2(Z) D_3(Z).$$

The splitting of the polynomials N(Z), D(Z) into polynomials of lower order makes it possible to obtain satisfactory results.

Furthermore, for the FIR filters, a representation as a causal filter portion and non-causal portion is senseless—since it requires twice the number of coefficients to be produced—so that the resultant FIR filtering characteristic of the causal and non-causal filter portion can be described by $$N(Z) N(Z^{-1}) = N^*_1(Z) N^*_2(Z) N^*_3(Z) N^*_4(Z) N^*_5(Z)$$

with:

$$N^*_1(Z) = N_1(Z) N_1(Z^{-1}), N^*_2(Z) = N_2(Z) N_2(Z^{-1}),$$

$$N^*_3(Z) = N_3(Z) N_3(Z^{-1}), N^*_4(Z) = N_4(Z) N_4(Z^{-1}),$$

$$N^*_5(Z) = N_5(Z) N_5(Z^{-1}),$$

where each $N^*_i(Z)$ is of order four and has coefficients of the form $$(\beta^{(i)}_2, \beta^{(i)}_1, \beta^{(i)}_0, \beta^{(i)}_1, \beta^{(i)}_2).$$

By contrast, each $D_i(Z)$ is of order two and is described by the coefficients $$(\alpha^{(i)}_0, \alpha^{(i)}_1, \alpha^{(i)}_2).$$

The coefficients of the FIR filtering cells are given below:

$$\beta^{(1)}_k = [377, 638, 1024, 638, 377]$$

$$\beta^{(2)}_k = [94, 349, 512, 349, 94]$$

$$\beta^{(3)}_k = [71, 177, 256, 177, 71]$$

$$\beta^{(4)}_k = [34, 159, 256, 159, 34]$$

$$\beta^{(5)}_k = [19, -155, 512, -155, 19].$$

The corresponding amplification factor for the FIR filter is $V_N = 12$.

With these values it emerges that the transfer function $N_1(Z)$ for the first FIR filtering cell may be expressed as follows:

$$N_1(Z) = 377 Z^2 + 638 Z + 1024 + 638 Z^{-1} + 377 Z^{-2}.$$

The other polynomials $N_2(Z) \ldots N_5(Z)$ could be written in the same way with the aid of the values of the coefficients given in the table above.

The coefficients of the three IIR filtering cells are given by the following table $$\alpha^{(1)}_k = [76, 128, 63]$$

$\alpha^{(2)}{}_k=[128, 82, 114]$ $\alpha^{(3)}{}_k=[128, 62, 66]$.

The corresponding amplification factor $V_D$ of the IIR filter is $V_D=2348/4096$.

According to the coefficients given in this table, the first polynomial of the splitting $D_1(Z)$ can be written:

$$D_1(Z)=76\ Z+128+63\ Z^{-1}.$$

The other polynomials are obtained in the same way, with the aid of the succeeding lines.

FIG. 12A shows the frequency response of the various denominator cells $D_i(Z)$, whilst FIG. 12B shows the frequency responses of the numerator cells $N^*{}_i(Z)$ (frequency along the abscissa, amplitude along the ordinate).

To avoid an unacceptable increase in the dynamic range in the digital signal path, the resonant frequencies of each denominator cell $D_i(Z)$ have to be compensated for by a preceding numerator cell $N^*{}_i(Z)$. A computer simulation has shown that the following combinations gave the minimum increase in the dynamic range:

$$N^*{}_4(Z)\ D_1(Z),\ N^*{}_3(Z)\ D_2(Z),\ N^*{}_2(Z)\ D_3(Z).$$

FIGS. 13A, 13B and 13C show the frequency responses of these combinations in the frequency region relevant to the IF signal. The gain is plotted along the ordinate and the frequency along the abscissa is expressed as the ratio of the frequency to half the sampling frequency (ratio $f/(f_s/2)$). The resultant variation in gain in each of these three combinations does not exceed a factor 2, that is to say 6 dB.

The proposed Nyquist filter architecture is now illustrated in FIG. 16 in which there are cascaded IIR filters 15A and 16A of similar architecture to that of the filters 15 and 16 already encountered. The filtering cell in each pathway of the portion 16A is denoted $H_b(Z)$ whilst in portion 15A the filtering cell is denoted $H_c(Z)$.

An FIR filtering cell denoted $H_a(Z)$ is provided upstream of the LIFO stack 19 whilst another FIR filtering cell denoted $H_d(Z)$ is provided downstream of the adder circuit 42.

The filtering cells, which constitute sub-filters, have the following transfer functions:

$$H_a(Z)=N^*{}_4(Z)$$

$$H_b(Z)=D_1(Z)\ N^*{}_3(Z)\ D_2(Z)\ N^*{}_2(Z)\ D_3(Z)$$

$$H_c(Z)=D_1(Z)\ D_2(Z)\ D_3(Z)$$

$$H_d(Z)=N^*{}_1(Z)\ N^*{}_5(Z).$$

The number L, already alluded to earlier, which defines the length of the section of sampled signal can have a significant influence on the complexity of the hardware as well as on its effectiveness. In order to obtain a first estimate of the maximum length of section required, the impulse responses of the filter with the frequency characteristic of $D_1(Z)$, $D_2(Z)$ and $D_3(Z)$ have been observed. FIGS. 14A, 14B and 14C show the corresponding impulse responses.

The responses $d_1(t)$ and $d_2(t)$ of FIGS. 14A and 14B show quite clearly their oscillating character arising from the resonant frequencies in the frequency responses whilst $d_3(t)$ in FIG. 14C, corresponding to the cell $D_3(Z)$, decreases very rapidly.

According to these results, it is not surprising that the overall impulse response of these three filters is governed by $d_1(t)$. FIG. 15A gives the result of convolving these three filters with $$d(t)=d_1(t)*d_2(t)*d_3(t).$$

If a dynamic resolution of 10 bits of the digital output signal is to be reckoned with, the length L of section required is obtained when the amplitude of the impulse response falls below $1/1000$ of the maximum impulse response amplitude. FIG. 15B represents, with the ordinate values magnified by a factor 1000, the impulse response d(t) for times expressed, along the abscissa, as a multiple of the sampling period. According to FIG. 15B it emerges that the minimum length of section L to obtain the desired result is around 110 times the sampling period T.

This value can be taken much smaller in practice since the input signal of the Nyquist filter will never be a delta pulse and the potential frequency components which give rise to the oscillations in the charts $d_1(t)$ and $d_2(t)$ of FIGS. 14A and 14B will be substantially attenuated by the preceding low-pass filter characteristic of $N^*{}_4(Z)$ and $N^*{}_3(Z)$. A brief calculation will make it possible to verify the final argument.

The maxima of $|D_1(Z)|$ (the absolute value of $D_1(Z)$) and $|D_2(Z)|$ can be deduced from FIG. 12A. They amount to around 22 for the maximum of the absolute value of $D_1(Z)$ and to around 10 for the maximum of the absolute value of $D_2(Z)$. By applying $N^*{}_4(Z)$ and $N^*{}_3(Z)$ before $D_1(Z)$ and $D_2(Z)$, the maxima will be almost compensated for. A number L giving a reasonable length of section can be of the order of 50.

A much simpler filter architecture can be produced if the overlap-add method for the IIR causal filter or filters is unnecessary. In this case, the Nyquist filter architecture is given by FIG. 17. The architecture of the non-causal filter 16B remains the same, but the IIR causal filter 15B is simplified and no longer includes two parallel pathways with an adder circuit, but simply a filtering cell denoted via its transfer function $H_3(Z)$. The other filtering cells are also denoted via their transfer function $H_1(Z)$ for the cell upstream of the LIFO stack 19 and $H_2(Z)$ for the cells of the non-causal filter 16B. The transfer functions of the filters are given by the following equations:

$$H_1(Z)=N^*{}_4(Z)\ D_1(Z)\ N^*{}_3(Z)\ D_2(Z)\ N^*{}_2(Z)\ D_3(Z)$$

$$H_2(Z)=D_1(Z)\ D_2(Z)\ D_3(Z)$$

$$H_3(Z)=N^*{}_1(Z)\ N^*{}_5(Z).$$

FIGS. 18A and 18B are diagrams for constructing IIR filtering cells.

The diagram of FIG. 18A corresponds to a second-order IIR filtering cell. The input signal x(n) arrives on an input of a subtractor circuit 43. The output signal from the circuit 43 is sent back to an input of this circuit by way of a first delay cell 44 which introduces a delay $\Delta t$. The output from this cell is sent on the one hand to an input of a multiplier circuit 45 and on the other hand to the input of another delay cell 46 similar to the cell 44. A multiplication coefficient $a_1$ is sent to another input of the multiplier circuit 45, the output from which is sent to an input of an adder circuit 47.

The output from the delay cell 46 is sent to an input of a multiplier circuit 48, another input of which receives the multiplication coefficient $a_2$. The output from the multiplier circuit 48 is sent to another input of the adder circuit 47. The output from the circuit 47 is linked to an input of the subtractor circuit 43.

The non-quantized equation between the input signal x(n) and the output signal y(n) is given by:

$$y(n)=x(n)-a_1y(n-1)-a_2y(n-2).$$

FIG. 18B is a diagram of a second-order IIR filtering cell, of the same type as that of FIG. 18A, but adapted for digital signal processing with amplification by a factor $2^m$ of the input signal x(n). The various circuits described in connection with FIG. 18A are found again and denoted by the same numerical references.

Furthermore, the subtractor circuit 43 is preceded by a circuit 49 making it possible to amplify the signal x(n) by $2^m$ so that the signal entering the circuit 43 is equal to $2^m x(n)$. The multiplier coefficients sent to the circuits 45 and 48 are respectively $\alpha_1$ and $\alpha_2$ with:

$$\alpha_1 = a_1 \, 2^{k_1} \text{ and } \alpha_2 = a_2 \, 2^{k_2}.$$

Between the output of the circuit 45 and the input of the circuit 47 there is provided a circuit 50 receiving the value $-k_1$ on an input; this circuit 50 outputs a signal equal to the product of the input signal times $2^{-k_1}$.

A circuit 51, similar to the circuit 50, is provided between the output of the multiplier 48 and the input of the adder 47, this circuit 51 receiving the value $-k_2$ and multiplying the input signal by $2^{-k_2}$.

Finally, a circuit 52 is provided just downstream of the output of the filtering cell. This circuit 52, similar to the circuits 49, 50 and 51, receives a value $-m$ and outputs the product of the input signal times $2^{-m}$.

The filtering cell of FIG. 18B makes it possible to obtain an output signal in quantized form of good quality.

FIG. 19A is a diagram of a fourth-order FIR filtering cell. The input signal x(n) is sent to the input of a delay cell 53 which is followed in series by three other cells 54, 55, 56 each introducing a delay $\Delta t$.

The input signal x(n) is also sent to an input of an adder circuit 57, another input of which receives the output from the cell 56. The output from the circuit 57 is sent to an input of a multiplier circuit 58, another input of which receives a multiplication coefficient $\beta_2$. The output from the multiplier circuit 58 is sent to an input of an adder circuit 59.

The output from the delay cell 53 is sent to an input of an adder circuit 60, another input of which receives the output from the cell 55. The output from the circuit 60 is sent to an input of a multiplier circuit 61, another input of which receives a coefficient $\beta_1$. The output from the circuit 61 is sent to another input of the adder circuit 59.

The output from the delay cell 54 is sent to an input of a multiplier circuit 62, another input of which receives a coefficient $\beta_0$. The output from the circuit 62 is sent to an input of an adder circuit 63, another input of which receives the output from the adder circuit 59. The output from the circuit 63 is sent to a circuit 64 which receives the exponent $-m$ on another input; the circuit 64 multiplies the signal exiting the circuit 63 by $2^{-m}$. The circuit 64 delivers the output signal y(n).

The coefficients $\beta_0, \beta_1$ and $\beta_2$ are equal to the product of $2^m$ times the coefficients desired for the FIR filtering cell.

FIG. 19B is a diagram of the combination of an FIR filtering cell 65 similar to that of FIG. 19A, with an IIR filtering cell 66 similar to that of FIG. 18B.

The FIR cell 65 is made up of the same circuit as the cell of FIG. 19A. However, the output of the circuit 58 is linked directly to an input of the circuit 63, whilst the output of the circuit 62 is linked to an input of the circuit 59.

The IIR cell comprises the subtractor circuit 43 situated ahead of the input of the cell 65. The signals taken off at the output of the delay cells 53, 54 via lines 67, 68 are sent back to an input of the subtractor circuit 43 as shown diagrammatically in FIG. 18B.

The invention makes it possible to carry out Nyquist filtering of digital video IF signals under economic conditions. The combining of FIR and IIR filtering cells leads to a significant reduction in the filtering coefficients which have effectively to be produced. Compared with a direct FIR filter design for which it would be necessary to produce around 50 coefficients, by exploiting the symmetry of the filter, in the example considered the proposed solution requires only 22 coefficients.

We claim:

1. A circuit for digital filtering intermediate frequency (IF) video signals having an analog to digital (A/D) converter and a Nyquist filter, comprising:

an analog prefilter placed upstream of said A/D converter for selecting the desired channel;

said Nyquist filter comprising a digital filter placed downstream of said A/D converter, said Nyquist filter including two IIR filters coupled together in cascade, one of said IIR filters being produced in non-causal form and the other IIR filter being produced in causal form; and said Nyquist filter further including an FIR filter coupled in series to said cascade IIR filters for correcting said IIR filters.

2. The circuit according to claim 1, wherein each IIR filter is a semi-Nyquist filter.

3. The circuit according to claim 1, wherein the IIR and FIR filters are combined in such a way as to reduce the signal dynamic swing and to use the same dynamic swing everywhere.

4. The circuit according to claim 1, wherein the IIR filter produced in a non-causal manner is the complex conjugate of the causal IIR filter so that after processing by the two IIR filters the video signal remains substantially linear in phase.

5. The circuit according to claim 1, wherein the IIR filter produced in a non-causal manner comprises video signal sampling means, means for chopping the sampled video signal into sections of predetermined length of time (LT), means of time inversion of the samples of the chopped sections before filtering, and second means of time inversion after filtering.

6. The circuit according to claim 5, wherein each means of time inversion of the samples before and after filtering includes an LIFO stack.

7. The circuit according to claim 6, wherein the non-causal filter includes two pathways shunted to the output of a first LIFO stack, each pathway including an identical IIR digital filter, a router means operating at a clock rate (LT) equal to L times the sampling period (T) being provided for alternately linking a filter to the output of the LIFO stack on one of the two pathways and for linking the other filter on the other pathway to a transmission of zeros of the same duration as the chopped section, a second router means operating at the same clock rate as the first being provided downstream of the two parallel filters for alternately linking the output of the filter which receives the time reversed samples of the chopped section to a delay cell introducing a delay (2 LT) equal to twice the duration of a section, the output of this delay cell being linked to an input of an adder another input of which is linked, via the second router means, to the output of the filter which receives the series of zeros, the output of the adder being linked to the second LIFO stack which re-establishes the time order of the filtered samples.

8. The circuit according to claim 7, wherein the number L is chosen such that the duration (LT), equal to the product of L times the sampling period, is sufficient for the trail of the filtered signal at the end of the passing of the sequence of zeros to be negligible.

9. The circuit according to claim 1, wherein the FIR filter and the IIR combined filter are split up into small filtering cells in such a way that the polynomial of the overall transfer function for each filter is equal to the product of several polynomials of lower order, the FIR corresponding to the polynomial of the numerator, whilst the IIR filter corresponds to the polynomial of the denominator.

10. The circuit according to claim 9, wherein the FIR filter is split up into five cells each having a transfer function of order 4, in the numerator, whilst the IIR filter, whose transfer function is in the denominator, is split up into three cells with transfer function of order 2.

11. The circuit according to claim 10, wherein the resulting FIR filter has a characteristic described by the relation:

$N(Z) N(Z^{-1}) = N^*_1(Z) N^*_2(Z) N^*_3(Z) N^*_4(Z) N^*_5(Z)$ with:

$N^*_1(Z) = N_1(Z) N_1(Z^{-1}), N^*_2(Z) = N_2(Z) N_2(Z^{-1})$, $N^*_3(Z) = N_3(Z) N_3(Z^{-1}) N^*_4(Z) = N_4(Z) N_4(Z^{-1})$, $N^*_5(Z) = N_5(Z) N_5(Z^{-1})$.

12. The circuit according to claim 10 wherein the coefficients of the FIR filter cells are as follows:

$\beta^{(1)}_k = [377, 638, 1024, 638, 377]$ $\beta^{(2)}_k = [94, 349, 512, 349, 94]$ $\beta^{(3)}_k = [71, 177, 256, 177, 71]$ $\beta^{(4)}_k = [34, 159, 256, 159, 34]$ $\beta^{(5)}_k = [19, -155, 512, -155, 19]$ whilst the coefficients of the IIR are as follows:

$\alpha^{(1)}_k = [76, 128, 63]$ $\alpha^{(2)}_k = [128, 82, 114]$ $\alpha^{(3)}_k = [128, 62, 66]$.

13. The circuit according to claim 11, wherein it is composed of sub-filters whose transfer functions are as follows:

$H_a(Z) = N^*_4(Z)$ $H_b(Z) = D_1(Z) N^*_3(Z) D_2(Z) N^*_2(Z) D_3(Z)$ $H_c(Z) = D_1(Z) D_2(Z) D_3(Z)$ $H_d(Z) = N^*_1(Z) N^*_5(Z)$.

14. The circuit according to claim 11, wherein it is composed of sub-filters whose transfer functions are as follows:

$H_1(Z) = N^*_4(Z) D_1(Z) N^*_3(Z) D_2(Z) N^*_2(Z) D_3(Z)$ $H_2(Z) = D_1(Z) D_2(Z) D_3(Z)$ $H_3(Z) = N^*_1(Z) N^*_5(Z)$.

15. The circuit according to claim 1, wherein the sampling frequency ($f_s$) is equal, or substantially equal, to:

$(4 f_{IFmax} - 2 B_{CH})/3$ with $f_{IFmax}$ equal to the maximum IF frequency, and $B_{CH}$ equal to the final bandwidth.

16. The circuit according to claim 15, wherein the sampling frequency ($f_s$) is equal, or substantially equal, to 48.87 MHz.

* * * * *